United States Patent [19]
Theurer et al.

[11] 3,816,927
[45] June 18, 1974

[54] MOBILE TRACK SURVEY APPARATUS FOR DETERMINING A TRACK PARAMETER

[76] Inventors: Josef Theurer, Johannesgasse 3, Vienna I; Franz Eglseer, Kleinreith 32, 4694 Ohlsdorf, both of Austria

[22] Filed: June 23, 1971

[21] Appl. No.: 155,861

[30] Foreign Application Priority Data
July 2, 1970  Austria .............................. 5958/70

[52] U.S. Cl. ............................. 33/144, 33/DIG. 13
[51] Int. Cl. ............................................. B61k 9/08
[58] Field of Search ............................. 33/338, 144

[56] References Cited
UNITED STATES PATENTS

| | | | |
|---|---|---|---|
| 2,761,216 | 9/1956 | Gollub | 33/DIG. 13 |
| 2,814,119 | 11/1957 | Grossmann | 33/144 |
| 2,859,528 | 11/1958 | Grossman | 33/144 |
| 3,345,746 | 10/1967 | Plasser et al. | 33/144 |
| 3,392,451 | 7/1968 | Lombardo | 33/144 |
| 3,604,359 | 9/1971 | Dorley et al. | 33/144 |

*Primary Examiner*—William D. Martin, Jr.
*Attorney, Agent, or Firm*—Kurt Kelman

[57] ABSTRACT

A sensing element engaged with one of the track rails is mounted on a mobile chassis for relative movement in respect thereto for measuring the position of the rail. A flexible rod is connected to the sensing element for flexing the rod in response to the relative movement thereof. The flexing of the rod causes a strain to be set up therein, and a resistance strain gage is mounted on the rod for measuring the strain. The resultant electrical measuring signal is proportional to the relative movement of the sensing element, which causes the flexing of the rod, and an electrical measuring signal indicator is connected to the strain gage for indicating the measuring signal.

12 Claims, 19 Drawing Figures

PATENTED JUN 18 1974 3,816,927
SHEET 1 OF 3
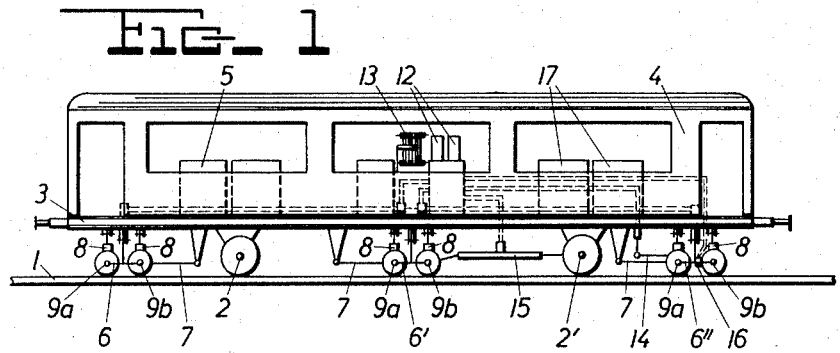
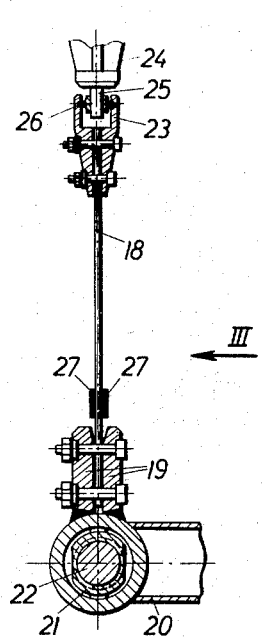
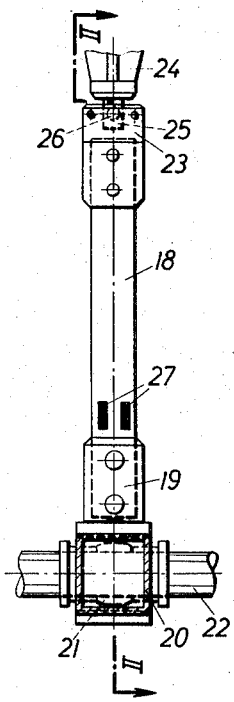
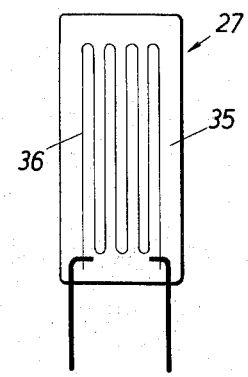
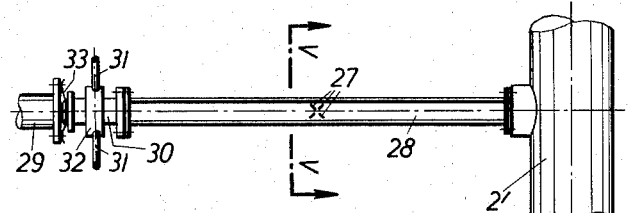
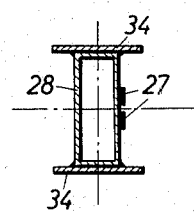
INVENTORS
JOSEF THEURER
FRANZ EGLSEER
BY
Kurt Kelman
AGENT

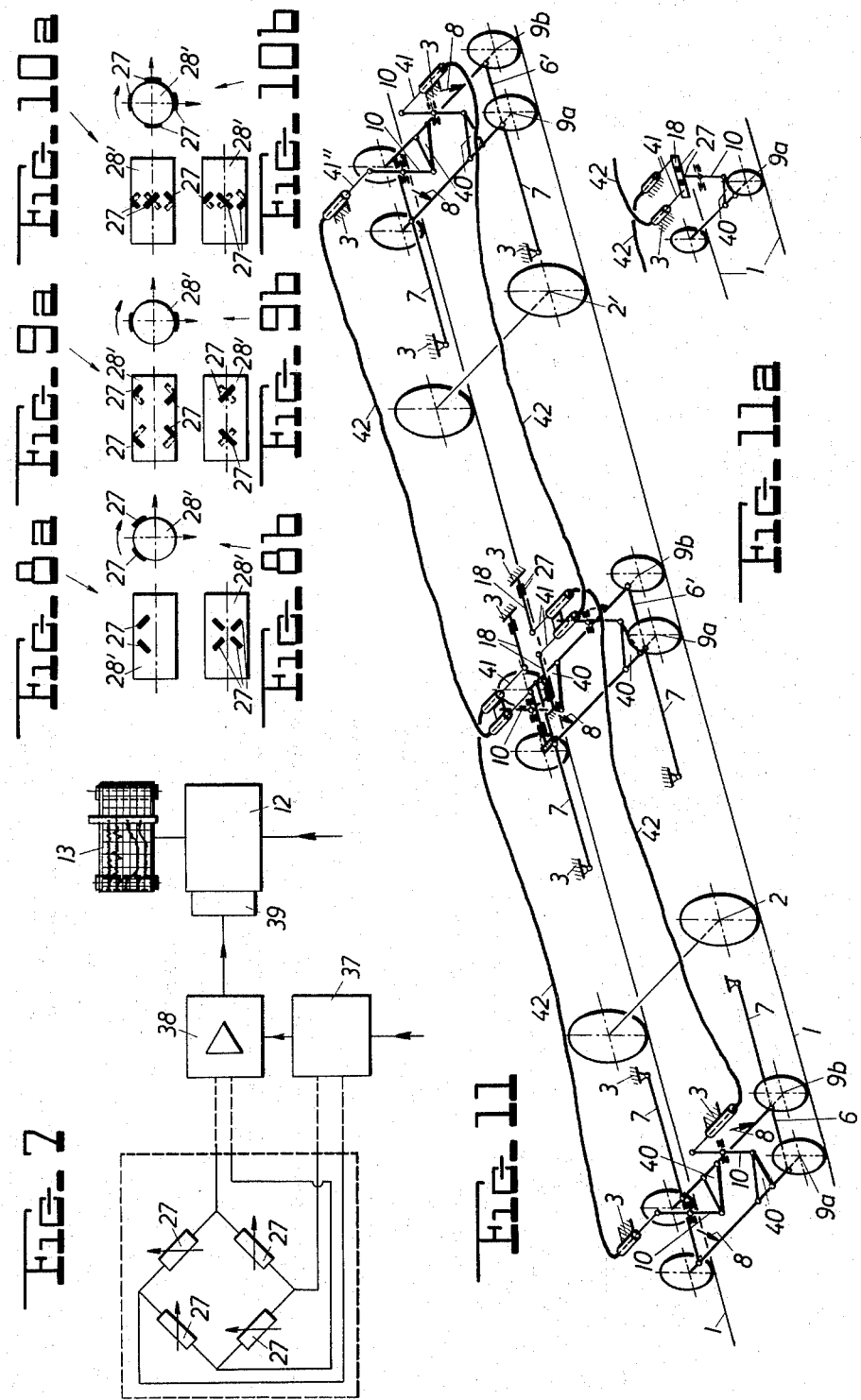

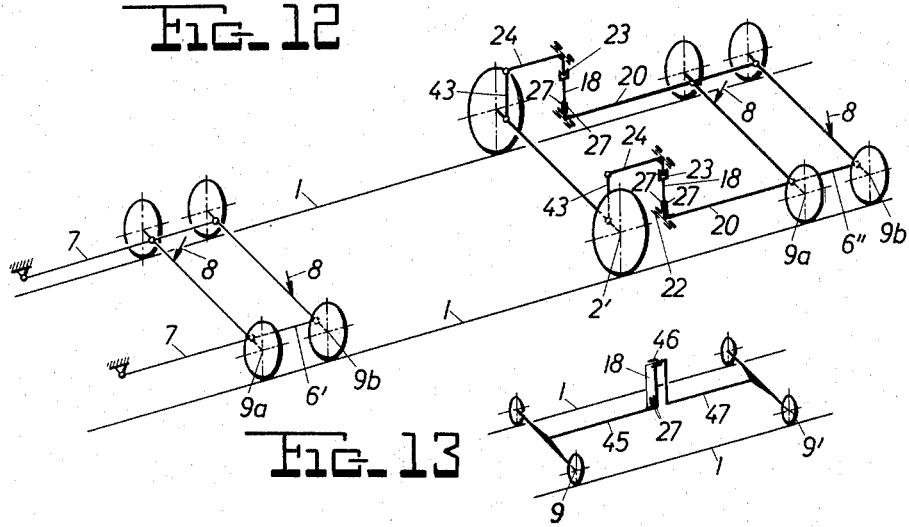
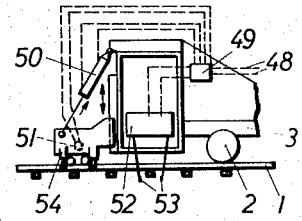
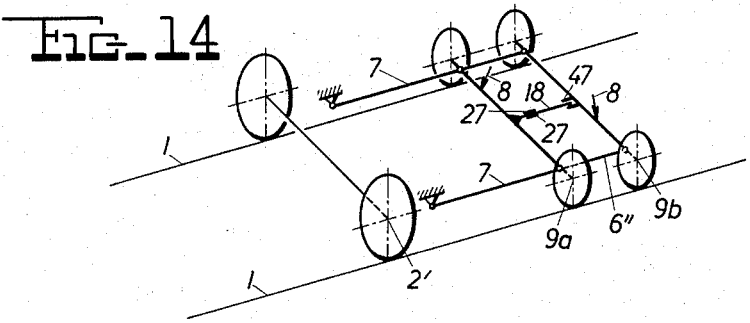

MOBILE TRACK SURVEY APPARATUS FOR DETERMINING A TRACK PARAMETER

The present invention relates to improvements in mobile track survey apparatus designed to determine such track parameters as rail alignment, i.e. the ordinates of rail reference points, unevenness in the vertical position or grade of the rails, camber of the track, track gage and the like.

Apparatus of this general type is known wherein a chassis is supported for mobility on the track rails on running gears for movement in the direction of elongation of the track, and comprises a sensing element or elements each engaged with one rail and mounted on the chassis for relative movement in respect thereto and of each other whereby the relative movement or movements of the sensing element or elements measures or measure the position of the rail engaged by each sensing element. In conventional track survey cars, these movements are transmitted mechanically to mechanical indicators or recorders. Such a mechanical transmission of the rail sensing element movement has many sources of error producing corresponding measuring errors.

This is avoided if the mechanical transmission and signals are replaced by an electrical measuring signal proportional to the relative movement of the sensing element, such electrical signals being readily transmitted to the signal indicator and/or recorder in the interior of the survey car. However, if the electrical signal generator, which converts the mechanical movement of the sensing element into a proportional electric signal, is relatively complex, it will not only be expensive but also subject to frequent break-downs, particularly since such instruments will normally have to be mounted on the underside of the chassis, to shorten the mechanical transmission path between sensing element and signal generator, where they are subject to much dirt and other rough operating conditions encountered in track maintenance and renewal work.

It is the primary object of this invention to overcome these and other disadvantages and to provide track surveying apparatus with instrumentation which is not only simple and, therefore, inexpensive to manufacture and operate but also exceedingly hardy under track maintenance and renewal operating conditions.

This and other objects are accomplished in accordance with the invention by connecting a flexible rod to the sensing element or between sensing elements for flexing the rod in response to the relative movements thereof. A resistance strain gage is mounted on the flexible rod for measuring the strain set up in the rod by the flexing thereof. The strain gage generates an electrical measuring signal proportional to the relative movement of the sensing element or elements which causes or cause the flexing of the rod and the resultant strain therein. An electrical measuring signal indicator, which may include a signal recorder, is connected to the strain gage for indicating the measuring signal, with a measuring circuit being interposed between the gage and the indicator.

Resistance strain gages, while simple and dependable in operation, give highly accurate signals produced by the changes in the electrical resistance due to the expansion or contraction of the wires embedded in the strain gage strips.

The flexible rod may be a leaf spring or a torsion rod.

If the track alignment or the ordinates of the rails are to be determined, the apparatus comprises three measuring gears mounted on the chassis at rail alignment reference points spaced from each other in the direction of track elongation. Two of the measuring gears are positioned near respective ends of the chassis and a center measuring gear is positioned therebetween. Each measuring gear includes at least one of the sensing elements constituted by an axle biased against a respective track rail into engagement therewith whereby the transverse movement of the measuring axle measures deviations in the ordinate of the rail alignment reference point engaged by the axle from a desired alignment. This apparatus has a pair of flexible rods each having a free end and extending substantially perpendicularly to the measuring axles, and an independent transmission between the measuring axle of a respective one of the end measuring gears and a respective one of the free rod ends for transmitting the transverse movement of the respective end measuring axle to the flexible rod ends. In addition, the flexible rod ends are mounted for movement in response to the transverse movement of the center measuring axle.

If the track gage is to be determined, the apparatus comprises two of the sensing elements respectively biased in opposite directions transverse of the track elongation against a respective track rail into engagment therewith for sensing the lateral position of the rails. The flexible rod interconnects the two rail sensing elements and extends substantially in the track elongation direction. One end of the flexible rod is clamped to one of the sensing elements while an opposite, free end of the rod is pivotally connected to the other rail sensing element.

If it is desired to measure the unevenness in the grade of the rail, i.e. the bumpiness of the track, the apparatus has the sensing element mounted on the chassis for free and substantially load-free relative vertical movement in respect thereto and adjacent a load-carrying running gear which supports the chassis on the track. The vertical movement of the sensing element measures the unevenness in the rail grade. A first lever is affixed to the running gear, a second lever is affixed to the sensing element, and the flexible rod is connected between the levers and is flexed by relative movement of the levers in respect of each other.

If the track camber is to be determined, the apparatus comprises two of the sensing elements constituted by axles spaced apart in the track elongation direction. In this case, the flexible rod may extend to the track elongation and have one end clamped to one axle and an opposite, free end pivotally connected to the other axle, or it may be a torsion rod extending in the track elongation direction and interconnecting the axles.

According to a preferred feature of the present invention, the resistance or wire strain gage is mounted on the flexible rod in the region of its greatest deformation or strain, i.e. at the end of the rod which is clamped either to the chassis or to one of the sensing elements, or centrally if the rod is a torsion rod.

If the flexible rod is a leaf spring having two opposite faces, a pair of parallel resistance strain gage strips may be mounted on each of the faces to constitute the strain gage.

With torsion rods, the strain gage strips are preferably arranged at an angle of 45° in respect of the longitudinal axis of the rod, i.e. in the principal directions of strain of the rod. For instance, the gage may comprise four strips arranged cruciform on the rod. In a preferred embodiment, torsion bars of rectangular cross section are used, and the resistance strain gage is mounted on one of the wide faces of the bar.

The chassis of the apparatus of this invention may be that of a track survey car or the frame of a track correction machine, such as a track tamping, leveling and/or lining machine. If the invention is used on such a machine, the electrical measuring signals are preferably amplified and transmitted to controls, such as solenoid valves, for automatically operating the track correction tools of the machine The above and other objects, advantages and features of the present invention will be more fully understood by reference to the following detailed description of some now preferred embodiments thereof, taken in conjunction with the accompanying drawing wherein FIG. 1 is a side view of a track surveying car incorporating the instrumentation of the invention;

FIG. 2 shows a flexible rod carrying a resistance strain gage according to this invention, in a section along line II—II of FIG. 3;

FIG. 3 is a top view of the rod in the direction of arrow III of FIG. 2;

FIG. 4 is a top view of a torsion bar carrying a strain gage according to another embodiment of the invention;

FIG. 5 is an enlarged sectional view of the torsion bar, along line V—V of FIG. 4;

FIG. 6 is a top view of a resistance strain gage strip;

FIG. 7 is a circuit diagram of a measuring signal generator and transmitter incorporating the strain gage means;

FIGS. 8 to 10 show different modifications of strain gage arrangements on torsion bars, in side views;

FIGS. 8a to 10a are respective top views of FIGS. 8 to 10;

FIGS. 8b to 10b are respective end views of FIGS. 8 to 10;

FIGS. 11, 11a, 12, 13 and 14 are schematic perspective views of apparatus for determining various track parameters; and FIG. 15 is a partial schematic view of a track tamping and levelling machine controlled by the apparatus of the present invention.

Referring now to the drawing, wherein like reference numerals designate like parts operating in a like manner in all figures, FIG. 1 shows a track survey car having a chassis 3 and a body 4. The chassis is mounted on running gears 2, 2' whose wheels run on track rails 1, 1 so that the track survey car is mounted for mobility in the direction of track elongation. In the illustrated embodiment, the selfpropelled, is self-prppelled, a drive motor 5 being connected to the axle of running gear 2 for moving the car along the track. Measuring gear units 6, 6' and 6'' are mounted on the chassis 3, the measuring gear unit 6' being arranged intermediate and substantially centrally between the running gears 2,2' while measuring gear units 6 and 6'' are arranged in the respective end regions of the track survey car adjacent the running gears.

Each measuring gear unit comprises two lateral rail position sensing elements constituted by axles 9a, 9b and is mounted on the chassis by pivotal rod 7 one of whose ends is pivoted to the underside of the chassis 3. Obliquely outwardly directed hydraulic motors 8 connect respective axles of each measuring gear unit to the chassis so that each gear may be lifted off the track rails when not in use. Due to their outward bias, the hydraulic motors simultaneously serve to press the flanged wheels of the measuring axles 9a, 9b against a respective rail, the axles 9a being shown pressed against the left rail while axles 9b are pressed against the right rail.

The ordinates, i.e. the lateral alignment of the track rails, are measured by all three measuring gears 6, 6', 6'' in a manner more fully described hereinafter in connection with FIG. 11 and particularly described and claimed in application Ser. No. 155,851, filed simultaneously herewith and entitled "Mobile Track Survey Apparatus" of which the joint inventor Josef Theurer is also a joint inventor. The illustrated car also carries additional apparatus 14 for determining the unevenness of the track, 15 for determining the track camber, and 16 for measuring the track gage, each such apparatus for determining a respective track parameter having its own measuring signal generator and transmitter, as will be fully explained hereinafter. The car is also shown to carry computers 17 to which the measured signals may be fed. Signal indicators and recorders 12 and 13 are also mounted on the car.

In accordance with the present invention, resistance strain gage means are used to generate and transmit measuring signals proportional to the track parameters measured by the sensing elements of the apparatus which engage the rails and are mounted for relative movement in respect thereto.

The resistance strain gage means are mounted on a flexible rod which is connected to a respective rail sensing element for flexing the rod in response to the relative movement thereof. This flexing causes a strain to be set up in the rod and the strain gage means measure these strains and generate an electrical measuring signal proportional to the relative movement of the sensing element which causes the flexing of the rod and the resultant strain therein.

FIGS. 2 and 3 illustrate one embodiment of such an arrangement wherein the flexible rod is a tempered steel leaf spring 18. One end of the leaf spring 18 is clamped to a respective sensing element while the other end is pivotally connected to another sensing element, the particularly illustrated mounting being shown in connection with the apparatus hereinafter described with reference to FIG. 12 for determining the unevenness or bumpiness of the track. In this particular embodiment, a lever arm 20 has one end affixed to a rail measuring axle 9a (FIG. 12) while its other end carries a bushing 21 pivotal on pivot pin 22 which is mounted on the chassis so that the lever arm will pivot freely in response to vertical movements of the measuring axle 9a. A clamp 19 is affixed to the bushing 21 and holds the one leaf spring end so that the leaf spring will be flexed in response to the pivotal movement of lever arm 20. The free end of the leaf spring 18 carries a forked member 23 which is provided to the lug 25 by means of a bearing 26 assuring the play-free transmission of the movement between member 23 and lug 25. The lug is affixed to a lever arm 24 having its other end affixed to a rail engaging axle (see FIG. 12). In the region of the greatest deformation or strain, i.e. adjacent the clamped end of the leaf spring 18, pairs of parallel resistance strain gage strips 27 are bonded to the opposite faces of the leaf spring.

As shown in FIG. 6, the strain gage 27 consists essentially of an insulating carrier material 35, such as an epoxy resin or an acrylic resin, having embedded therein a serpentine metal wire 36, such gages being commercially aviailable. When the flexible rod is subjected to flexing or torsion, the resultant tension and/or compression forces cause a corresponding and measurable expansion or contraction of the embedded wire. This, in turn, produces a change in the electrical resistance of the wire which, when the gages are incorporated into an electrical measuring bridge, generate a current giving a measuring signal proportional to the relative movements of the axles engaging the rail. If desired, the strain gage strips may be protected against mechanical damage and/or weather conditions by suitable protective covers.

FIGS. 4 and 5 show an embodiment wherein the flexible rod is a hollow torsion bar 28 of rectangular cross section having two wide faces opposite each other, the strain gages 27 being mounted on one of the wise faces, the particularly illustrated mounting being shown in connection with the apparatus hereinafter described with reference to FIG. 13 for determining the track camber. In this particular embodiment, one end of the tubular torsion bar 28 is affixed to the axle of running gear 2' so that it cannot rotate in relation thereto while the other end of the torsion bar is pivotally connected to a connecting tube 29 which is affixed to measuring axle 9b (see FIG. 13) in such a manner that it cannot rotate in relation thereto. Interposed between the connecting tube 29 and the other end of torsion bar 28 is a pivot pin 30 pivotally journaled in bearing 32 which is carried by bracket 31 on chassis 3. The connecting tube 29 is linked to the axle 9b as well as to the pivot pin 30 for pivotal but against rotational movement in respect thereto, the illustrated link being a cup spring 33.

As shown, four strain gages 27 are bonded to one wide face of the torsion bar at an angle of 45° in respect of the longitudinal axis of the bar. The strain gage means is centrally mounted and the strips extend cruciform in the main directions of the torsions to which the bar is subjected. Reinforcing sheet metal strips 34 are mounted on the opposite narrow faces of the torsion bar.

FIG. 7 schematically illustrates the circuit diagram of a measuring signal generator and transmitter incorporating four strain gages 27 in a measuring bridge which receives current from a supply circuit through operating voltage stabilizer 37. The measuring signal is fed from the bridge to carrier frequency amplifier 38 which is also energized through stabilizer 37, and the amplified signal is rectified, further amplified and filtered, if desired, at 39 whence it is transmitted to the indicator instrument 12 and the signal recorder 13 which makes a permanent record of the recorded signals. If computers are provided, the signal may be fed into the computers, too. The measuring bridge is balanced to give a zero reading when the track has the desired parameter so that each deviation from the desired parameter unbalances the bridge and produces a corresponding pulse signal.

FIGS. 8 to 10 show various arrangements of the strain gage strips on a torsion bar 28' in side view, while FIGS. 8a to 10a illustrate these arrangements in top view and FIGS. 8b to 10b in end view. FIG. 8 shows the cruciform arrangement more fully described hereinabove in connection with FIGS. 4 and 5. In FIG. 9, the four strain gage strips are so arranged that a pair of adjacent strips is mounted on the diametrically opposite upper and lower face of the torsion bar 28', these strips, too, enclosing an angle of 45° with the longitudinal axis of the bar, the diametrically opposed strips extending in the same directions. In the arrangement of FIG. 10, the strain gage strips are mounted in diametrically opposed pairs around the circumference of the bar in the same transverse plane, being spaced apart 90° and also inclined by 45° in alternate directions. In all three arrangements, the tubular torsion bar has been shown to be of circular, rather than rectangular, cross section.

The arrangement of the four strain gage strips at an angle of 45° in respect of the longitudinal axis, with each two of the strips extending in the same direction, assures proper balancing of all tension, compression and flexing forces or vibrations, as well as temperature conditions, to which the flexible rod may be subjected, thus assuring a correct measuring signal.

When the flexible rod is subjected to tension, the stretching of the rod will be transmitted evenly to all strain gage strips so as to increase their electrical resistance, even contraction occurring upon compression of the rod to reduce the electrical resistance evenly. If the rod is upwardly flexed, the upper face of the rod will be compressed while the lower face will be subjected to tension, the balancing of these forces having been explained hereinabove in connection with the arrangement of FIG. 8. In the arrangements of FIGS. 9 and 10, the resistance in the upper strain gage strips will fall (compression) and the resistance of the strips below the bending line will rise by the same amount. Through a proper circuit arrangement, this condition is compensated so that the measuring bridge remains balanced. Similar conditions arise when the rod is flexed laterally.

FIG. 11 shows the measuring signal generator and transmitter of this invention applied to apparatus for measuring the lateral alignment of the track rails, as generally described and claimed in copending application Ser. No. 155,851, filed simultaneously herewith and entitled "Mobile Track Survey Apparatus" of which the joint inventor Josef Theurer is also a joint inventor.

Each measuring axle 9a, 9b of the measuring gears 6, 6', 6" carries a triangular steering element 40 which moves with the respective axle transversely of the chassis 3 when the alignment of the rail 1, against which a flanged wheel of the axle is pressed, changes whereby the transverse displacement of the axle measures the change in alignment. A two-armed lever 10 has its lower arm linked to the steering element of each measuring axle, the lever being pivotally mounted on the chassis so that it will be pivoted in response to the transverse displacement of the axle, the pivotal movement of the lever 10 in a plane transverse to the track elongation being in direction porportion to the transverse linear displacement of the axle. The upper arm of lever 10 of the end measuring gears 6, 6" is connected to one end of the core 41 of a Bowden cable whose sleeve 42 has one end fixed to chassis 3 while its other end is fixed to the upper arms of pivotal levers 10 of the measuring axles of the centrally positioned measuring gear 6'. The other end of the Bowden cable core 41 is fixed to the free end of flexible rod 18 carrying a strain gage means near the end of the rod clamped to chassis 3. In this manner, the relative transverse movement of the measuring axles 9a, 9b of the end measuring gears in respect of chassis 3 is measured independently of any lateral movement thereof and is combined with the relative movement of the measuring axles of the center measuring gear, the Bowden cable serving to transmit the movements of the measuring axles to the flexible rods 18.

In the modification of this apparatus illustrated in FIG. 11a, the flexible rod 18 is clamped to the upper arm of pivotal lever 10 and the sleeves 42 of the two Bowden cables transmitting the motion of the end gears are affixed to the chassis, thus producing the same operation as in FIG. 11.

FIG. 12 shows the measuring signal generator and transmitter of this invention applied to apparatus for measuring the vertical position, grade or unevenness of the track, as generally described and claimed in our copending application Ser. No. 155,862 filed June 24, 1971 herewith and entitled "Mobile Track Survey Apparatus for Determining Grade Variations."

In this embodiment, the measuring gear unit 6'' has affixed thereto a pivotal lever arm 20 associated with each rail 1, each lever arm being pivotally mounted on chassis 3 in a manner shown more fully in FIGS. 2 and 3. The lever arms 20 form part of bell-crank levers whose other arms have clamped thereto one end of flexible rod 18 which thus forms the other arms of the bell-crank levers. As also more clearly shown in FIGS. 2 and 3, the other end of each rod 18 is pivotally connected to one arm of an associated bell-crank lever so that the rod forms the one arm of the latter lever while the other arm thereof is affixed to a steering element 43 extending from the axle of the running gear 2'. The latter bell-crank levers are also pivotally mounted on the chassis. The running gear 2' supports the load of the chassis resiliently. When there is a grade difference between the axle of running gear 2' and that of measuring gear 6'', a relative movement will ensue between the two bell-crank levers respectively affixed to these axles, such movement being indicated by proportional measuring signals generated by the strain gage means 27 on the flexible rod 18 interconnecting the two levers.

When the running gear 2' passes over a bumpy track point, the lever arm 24 will move not only in response to the track grade change but will also indicate any additional resilient movement of the chassis in respect of the running gear while the adjacent measuring gear 6'', which is free of any load, will move its lever 20 only in response to grade variations. In this way, the measured parameter between the loaded axle 2' and the load-free axle 6'' indicates the track condition, i.e. whether the elastic deformation of the rail 1 by the load on running gear 2' lies within permissible boundaries or whether the ballast bed requires tamping. These conditions may be readily determined if the measured signals are fed into a computer 17.

FIG. 13 shows the application of the measuring signal generator and transmitter of the invention to apparatus for measuring the track camber. In this apparatus, two measuring axles 9 and 9' have rigidly affixed arms 45, 47, respectively, extending towards each other in the center of the track and parallel thereto. One end of flexible rod 18 is clamped to the arm 45 while the free end of the rod is pivotally connected to the forked member 46 mounted on a vertical extension of arm 47.

The embodiment of FIG. 14 shows the invention applied to apparatus for determining the track gage. Each measuring axle 9a, 9b of the measuring gear unit 6'' is pressed by hydraulic motor 8 against a respective rail 1, the lateral displacements of the two axles measuring the track gage, i.e. the latter distance between the two rails in a manner fully described and claimed in copending application Ser. No. 156,245, filed June 24, 1972 herewith and entitled "Mobile Track Gage Measuring Apparatus" of which the joint inventor Josef Theurer is a joint inventor.

The flexible rod 18 interconnects the two axles so that the relative movements thereof are transmitted directly thereto, one end of the rod being clamped to axle 9a while an opposite, free end thereof is pivotally connected to axle 9b, this end extending into a forked member 47 affixed to axle 9b.

FIG. 15 schematically illustrates the front end of a mobile tamping and levelling machine of generally known structure, the chassis 3 of the machine carrying a rail engaging mechanism 54 whose rail engaging rollers may be moved by hydraulic motors 50 and 51 vertically and laterally for grading and lining the track in a well known manner, and a tamping mechanism 53 operated by drive 52. The measuring signals generated in the manner described herein are fed directly to an indicator consisting of a bank of solenoid valves controlling the operation of motors 50, 51 and 52.

We claim:

1. In a mobile track survey apparatus for determining a track parameter, the apparatus having a chassis mounted for mobility on the track rails for movement in the direction of elongation of the track, and a pair of track sensors each including two sensing elements engaged with a respective one of the rails and mounted on the chassis for relative movement in respect thereto and to each other for measuring the position of the rails the improvement comprising
  1. a rod flexible in at least a portion thereof and interconnecting the track sensors,
     a. the flexible portion of the rod being flexed in response to the relative movement of the interconnected track sensors and
     b. flexing of the flexible rod portion causing a strain to be set up therein;
  2. a strain gage mounted on the flexible rod portion for measuring the strain,
     a. the strain gage generating an electrical measuring signal proportional to the relative movement of the track sensors and the resultant strain; and
  3. an electrical measuring signal indicator connected to the strain gage for indicating the measuring signal.

2. The mobile track survey apparatus of claim 1, wherein the indicator includes a signal recorder.

3. The mobile track survey apparatus of claim 1, wherein the rod is a leaf spring.

4. The mobile track survey apparatus of claim 1, wherein the rod is a torsion rod.

5. The mobile track survey apparatus of claim 1, wherein the chassis forms part of a track survey car and the sensing elements are mounted below the chassis.

6. The mobile track survey apparatus of claim 1, wherein the chassis forms part of a mobile track correction machine carrying mechanisms for correcting the track, and the indicator includes a control for operating said mechanisms in response to respective ones of said signals.

7. The mobile track survey apparatus of claim 1, wherein the track parameter is a track ordinate, comprising three of said track sensors mounted on the chassis for lateral movement in respect thereto, the three track sensors being spaced from each other in the direction of track longation, two of the track sensors being positioned at respective reference end points for measurement of the track ordinage and the third track sensor being positioned therebetween at a measuring point for the track ordinate, the track sensor being constituted by axles biased against a respective one of the track rails into engagement therewith whereby the transverse movement of the sensing axles measures deviations in the ordinate, a pair of said rods each having a free end and extending substantially perpendicularly to the axles, an elongated flexible connecting element connecting a respective one of the free rod ends to a respective one of the two sensing axles and a linkage connecting the free ends to the third sensing axle.

8. The mobile track survey apparatus of claim 7, wherein each of said rods has an end, opposite to the free end clamped to the chassis and the elongated flexible concecting elements are movable by the third sensing axle transversely in respect of the free rod ends to flex the rods.

9. The mobile track survey apparatus of claim 7 wherein each of the rods has an end opposite to the free end affixed to the third sensing axle.

10. The mobile track survey apparatus of claim 1, wherein the rod has one end clamped to one of the track sensors against flexing movement of the one end and the strain gage is mounted adjacent the clamped rod end.

11. The mobile track survey apparatus of claim 10, wherein the rod has two opposite faces, a pair of parallel strain gage strips being mounted on each of said faces to constitute the strain gage.

12. The mobile track survey apparatus of claim 1, wherein the track parameter indicates the track camber and the each track sensor comprises two axles mounted on the chassis and spaced from each other in the track elongation direction, each axle carrying a pair of rail sensing wheels defining a rectangle of four rail points whose relative vertical position is being surveyed by the rail sensing wheels, each of the two axles having rigidly affixed arms extending towards each other in the center of the track and substantially parallel thereto, one of the arms having a vertical extension, and the rod ends being connected respectively between one of the arms and the arm extension, whereby the rod extends substantially vertically to the track plane, one rod end being clamped and the other rod end being pivoted.

* * * * *